United States Patent
Si et al.

(10) Patent No.: US 12,362,895 B2
(45) Date of Patent: Jul. 15, 2025

(54) BWP SWITCHING METHOD, TERMINAL AND NETWORK SIDE DEVICE

(71) Applicant: VIVO MOBILE COMMUNICATION CO., LTD., Dongguan (CN)

(72) Inventors: Ye Si, Dongguan (CN); Peng Sun, Dongguan (CN); Huaming Wu, Dongguan (CN); Yuanyuan Wang, Dongguan (CN); Zixun Zhuang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 458 days.

(21) Appl. No.: 17/880,576

(22) Filed: Aug. 3, 2022

(65) Prior Publication Data
US 2022/0376882 A1    Nov. 24, 2022

Related U.S. Application Data

(63) Continuation of application No. PCT/CN2021/074880, filed on Feb. 2, 2021.

(30) Foreign Application Priority Data

Feb. 6, 2020  (CN) .......................... 202010081536.6

(51) Int. Cl.
*H04L 5/00* (2006.01)
*H04L 27/26* (2006.01)

(52) U.S. Cl.
CPC .......... *H04L 5/0098* (2013.01); *H04L 5/0051* (2013.01); *H04L 27/26025* (2021.01); *H04L 27/2605* (2013.01)

(58) Field of Classification Search
CPC ................ H04L 5/0051; H04L 5/0048; H04L 27/26025; H04L 27/2605; H04L 5/001;
(Continued)

(56) References Cited

U.S. PATENT DOCUMENTS

| | | | |
|---|---|---|---|
| 2020/0022167 A1 | 1/2020 | Manolakos et al. | |
| 2020/0358576 A1* | 11/2020 | Zarifi | ...................... H04L 43/08 |
| 2022/0141849 A1* | 5/2022 | Lee | ..................... H04W 72/566 |
| | | | 370/329 |

FOREIGN PATENT DOCUMENTS

| | | |
|---|---|---|
| CN | 110574331 A | 12/2019 |
| CN | 110730056 A | 1/2020 |

(Continued)

OTHER PUBLICATIONS

3GPP TSG RAN WG1 #99 R1-1912295, Reno, NV, Nov. 18-22, 2019, Agenda item: 7.2.10.4, Source: Nokia, Nokia Shanghai Bell; Title: Views on Physical Layer Procedures for NR Positioning (Year: 2019).*

(Continued)

*Primary Examiner* — Nizam U Ahmed
(74) *Attorney, Agent, or Firm* — IPX PLLC

(57) ABSTRACT

A bandwidth part (BWP) switching method, a terminal and a network side device are provided. The BWP switching method performed by the terminal includes: receiving a BWP activation signaling, switching to a first BWP according to the received BWP activation signaling; and receiving a positioning reference signal (PRS) on the first BWP, wherein the first BWP meets at least one of the following: a numerology of the first BWP is consistent with a numerology of the PRS; or a bandwidth of the first BWP is not less than a bandwidth of the PRS.

20 Claims, 6 Drawing Sheets

(58) Field of Classification Search
CPC ... H04L 5/0012; H04L 5/0069; H04L 5/0091; H04L 5/0098; G01S 5/0236; G01S 5/00; G01S 5/0063; G01S 5/02; G01S 5/0205; G01S 5/021; H04W 64/00; H04W 24/10; H04W 4/02; H04W 48/20; H04W 64/003; H04W 74/04; H04W 74/0833; H04W 74/0836; H04W 74/0838; H04W 76/30; H04W 88/02; G06N 3/0442; G06N 3/045; G06N 3/0464; G06N 3/08; Y02D 30/70
See application file for complete search history.

(56) References Cited

FOREIGN PATENT DOCUMENTS

| CN | 111417189 A | 7/2020 |
|---|---|---|
| WO | 2019084570 A1 | 5/2019 |
| WO | 2019211496 A1 | 11/2019 |
| WO | 2020191736 A1 | 10/2020 |

OTHER PUBLICATIONS

Extended European Search Report issued in related European Application No. 21751445.4, mailed May 10, 2023, 16 pages.
Nokia et al., "Views on Physical Layer Procedures for NR Positioning", 3GPP TSG RAN WG1 #99; R1-1912295, Nov. 2019, 5 pages.
Huawei, "Remaining issues on DL based positioning", 3GPP TSG RAN WG1 Meeting #96, R1-1901574, Feb. 2019, 8 pages.
First Office Action issued in related Chinese Application No. 202010081536.6, mailed Jul. 27, 2022, 13 pages.
Nokia et al., "Views on Physical Layer Procedures for NR Positioning", 3GPP TSG RAN WG1 #98; R1-1910890, Oct. 2019, 6 pages.
Second Office Action issued in related Chinese Application No. 202010081536.6, mailed Jan. 18, 2023, 11 pages.
International Search Report issued in corresponding International Application No. PCT/CN2021/074880, mailed Apr. 29, 2021, 5 pages.
Intel Corporation, "Downlink and Uplink Reference Signals for NR Positioning", 3GPP TSG RAN WG1 Meeting #96bis, R1-1904320, Apr. 12, 2019.
Intel Corporation, "On Radio-Layer Procedures for NR Positioning", 3GPP TSG RAN WG1 Meeting #96bis, R1-1904322, Apr. 12, 2019.

* cited by examiner

Send a BWP activation signaling, where the BWP activation signaling is used to indicate that the terminal is to be switched to a first BWP to receive a PRS ⟵ 31

FIG. 3

Send a first request message, where the first request message is used to indicate that the first network side device switches the BWP of the terminal to a first BWP to receive a PRS or is used to request the first network side device to send a BWP activation signaling, and the BWP activation signaling is used to indicate that the terminal is to be switched to the first BWP to receive the PRS ⟵ 41

FIG. 4

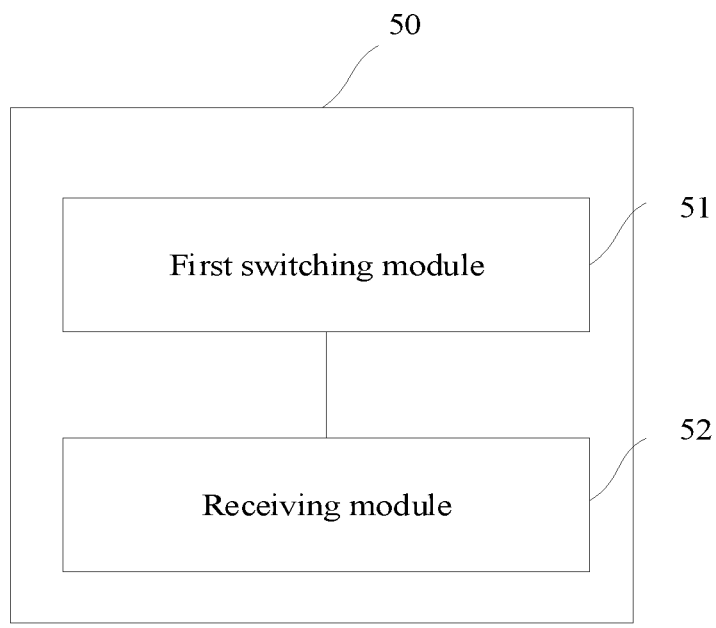

FIG. 5

BWP SWITCHING METHOD, TERMINAL AND NETWORK SIDE DEVICE

CROSS-REFERENCE TO RELATED APPLICATIONS

This application is a continuation of International Application No. PCT/CN2021/074880, filed Feb. 2, 2021, which claims priority to Chinese Patent Application No. 202010081536.6, filed Feb. 6, 2020. The entire contents of each of the above-referenced applications are expressly incorporated herein by reference.

TECHNICAL FIELD

Embodiments of the present disclosure relate to the technical field of wireless communication, and in particular, to a BWP switching method, a terminal and a network side device.

BACKGROUND (1) Brief Introduction of a Bandwidth Part (BWP).

In the 5G system, User Equipment (UE, may also be referred to as a terminal) may only support one small work bandwidth (such as 40 MHz), one cell on a network side will support a large bandwidth (such as 100 MHz), and the small bandwidth part where the UE works in the large bandwidth is considered as a BWP. The network side may configure that UE has one or more BWPs, and switch the current active BWP of the UE through a BWP switching command (such as Physical Downlink Control Channel (PDCCH) indicating information), that is, activate a new BWP and deactivate the currently activated BWP. Currently, only one BWP can be activated for the UE in one cell. The BWP switching is the switching among a plurality of BWPs in the same cell.

BWP can achieve the following benefits: support is provided for the UE with the receiver bandwidth (such as 20 MHz) less than the bandwidth (such as 100 MHz) of the whole system; the electricity consumption of the UE is reduced through switching and adaption among BWPs with different bandwidths; a numerology may be changed by switching the BWP; the utilization of a wireless resource is optimized according to the traffic requirement, and interference among the systems is reduced; a carrier may be configured with discontinuous frequency bands; and a frequency band may be reserved in the carrier for supporting a to-be-defined transmission format.

(2) Brief Introduction of Positioning Reference Signal (PRS).

New Radio (NR) redesigns an NR system downlink positioning reference signal (NR DL PRS).

PRS supports transmission at a maximum of 100 M in FR1 and a maximum of 400 M in FR2. NR PRS bandwidth configuration is unrelated to BWP configuration. When the PRS bandwidth is greater than the BWP bandwidth, the UE is supported to use a measurement gap to measure the PRS.

In the prior art, when the PRS bandwidth exceeds the range of a downlink active BWP (DL active BWP) or the numerology of the PRS is inconsistent with the downlink active BWP, the UE may use the configured measurement gap to receive the PRS. However, when the UE uses the measurement gap to measure the PRS, a new limitation will be introduced, and the UE cannot perform data transmission within a time interval of the measurement gap.

SUMMARY

Embodiments of the present disclosure provide a BWP switching method, a terminal, and a network side device.

According to a first aspect, the embodiments of the present disclosure provide a BWP switching method, performed by a terminal and including:
  switching to a first BWP according to the received BWP activation signaling; and
  receiving a positioning reference signal (PRS) on the first BWP,
  where the first BWP meets at least one of the following:
  a numerology of the first BWP is consistent with a numerology of the PRS; or
  a bandwidth of the first BWP is not less than a bandwidth of the PRS.

According to a second aspect, the embodiments of the present disclosure provide a BWP switching method, applied to a first network side device and including:
  sending BWP activation signaling, where the BWP activation signaling is used to indicate that the terminal is to be switched to a first BWP to receive a PRS,
  where the first BWP meets at least one of the following:
  a numerology of the first BWP is consistent with a numerology of the PRS; or
  a bandwidth of the first BWP is not less than a bandwidth of the PRS.

According to a third aspect, the embodiments of the present disclosure provide a BWP switching method, applied to a second network side device and including:
  sending a first request message, where the first request message is used to indicate that the first network side device switches the BWP of the terminal to a first BWP to receive a PRS or is used to request the first network side device to send BWP activation signaling, and the BWP activation signaling is used to indicate that the terminal is to be switched to the first BWP to receive the PRS.
  The first BWP meets at least one of the following:
  a numerology of the first BWP is consistent with a numerology of the PRS; or
  a bandwidth of the first BWP is not less than a bandwidth of the PRS.

According to a fourth aspect, the embodiments of the present disclosure provide a terminal, including:
  a switching module, configured to switch to a first BWP according to the received BWP activation signaling; and
  a receiving module, configured to receive a PRS on the first BWP,
  where the first BWP meets at least one of the following:
  a numerology of the first BWP is consistent with a numerology of the PRS; or
  a bandwidth of the first BWP is not less than a bandwidth of the PRS.

According to a fifth aspect, the embodiments of the present disclosure provide a first network side device, including:
  a sending module, configured to send BWP activation signaling, where the BWP activation signaling is used to indicate that the terminal is to be switched to a first BWP to receive a PRS;
  where the first BWP meets at least one of the following:
  a numerology of the first BWP is consistent with a numerology of the PRS; or
  a bandwidth of the first BWP is not less than a bandwidth of the PRS.

According to a sixth aspect, embodiments of the present disclosure provide a second network side device, including:
  a sending module, configured to send a first request message, where the first request message is used to indicate that the first network side device switches the BWP of the terminal to a first BWP to receive a PRS, or is used to request the first network side device to send BWP activation signaling, and the BWP activation signaling is used to indicate that the terminal is to be switched to the first BWP to receive the PRS.

The first BWP meets at least one of the following:

a numerology of the first BWP is consistent with a numerology of the PRS; or a bandwidth of the first BWP is not less than a bandwidth of the PRS.

According to a seventh aspect, the embodiments of the present disclosure provide a terminal, including a processor, a memory, and a computer program stored in the memory and capable of running on the processor, where when the computer program is executed by the processor, the steps of the BWP switching method according to the first aspect are implemented.

According to an eighth aspect, the embodiments of the present disclosure provide a network side device, including a processor, a memory, and a computer program stored in the memory and capable of running on the processor, where when the computer program is executed by the processor, the steps of the BWP switching method according to the second aspect are implemented.

According to a ninth aspect, the embodiments of the present disclosure provide a network side device, including a processor, a memory, and a computer program stored in the memory and capable of running on the processor, where when the computer program is executed by the processor, the steps of the BWP switching method according to the third aspect are implemented.

According to a tenth aspect, the embodiments of the present disclosure provide a computer-readable storage medium. The computer-readable storage medium stores a computer program, and when the computer program is executed by a processor, the steps of the BWP switching method according to the first aspect are implemented; or when the computer program is executed by a processor, the steps of the BWP switching method according to the second aspect are implemented; or when the computer program is executed by a processor, the steps of the BWP switching method according to the third aspect are implemented.

In the embodiments of the present disclosure, the terminal can be switched to the first BWP conforming to the PRS measurement condition according to the received BWP activation signaling and receive the PRS on the first BWP, and the terminal does not need to measure the PRS in the measurement gap, so that it is unnecessary to interrupt data transmission, and the effectiveness of data transmission is improved.

BRIEF DESCRIPTION OF DRAWINGS

With reference to detailed descriptions in implementations in the following descriptions, various other advantages and benefits become clear to a person of ordinary skills in the art. The accompanying drawings are merely used to show implementation manners, and are not considered as limitations to the present disclosure. In addition, in all the accompanying drawings, a same reference symbol is used to represent a same part. In the accompanying drawings:

FIG. 3 is a schematic flowchart of a BWP switching method according to another embodiment of the present disclosure;

FIG. 4 is a schematic flowchart of a BWP switching method according to yet another embodiment of the present disclosure;

FIG. 5 is a schematic diagram of a structure of a terminal according to an embodiment of the present disclosure;

DETAILED DESCRIPTION

The term "include" and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, "and/or" used in the description and the claims means at least one of the connected objects. For example, A and/or B represents the following three cases: Only A exists, only B exists, and both A and B exist.

In the embodiments of the present disclosure, the term such as "exemplary" or "for example" is used to represent an example, an instance, or a description. Any embodiment or design solution described as "exemplary" or "for example" in the embodiments of the present disclosure should not be construed as being more preferred or advantageous than other embodiments or design solutions. Exactly, use of the word such as "exemplary" or "example" is intended to present a concept in a specific manner.

Embodiments of the present disclosure will be described below with reference to the accompanying drawings. A BWP switching method, a terminal and a network side device provided in the embodiments of the present disclosure may be applied to a wireless communication system. The wireless communications system may be a 5G system, an Evolved Long Term Evolution (eLTE) system, or a subsequent evolved communications system.

Figure 1:
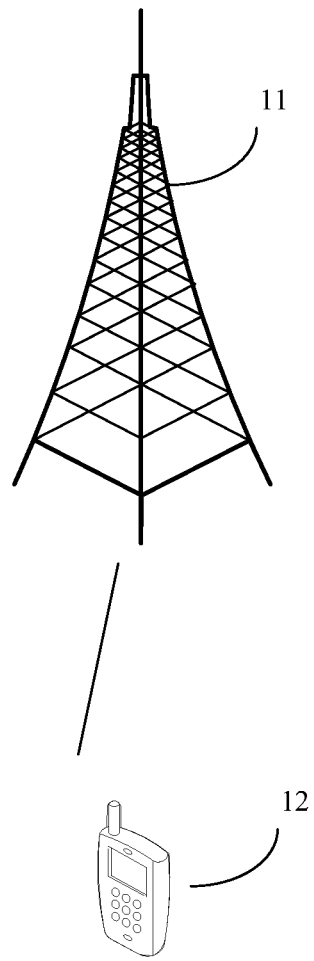
FIG. 1 is a schematic architectural diagram of a wireless communications system according to an embodiment of the present disclosure.

Referring to FIG. 1, it is a schematic architectural diagram of a wireless communications system according to an embodiment of the present disclosure. As shown in FIG. 1, the wireless communications system may include: a network side device 11 and a terminal 12. The terminal 12 may be connected to the network side device 11. In actual application, a connection between the foregoing devices may be a wireless connection. To conveniently and intuitively represent a connection relationship between the devices, a solid line is used for illustration in FIG. 1.

It should be noted that the communications system may include a plurality of terminals 12, and the network side device 11 may communicate (transmit signaling or data) with the plurality of terminals 12.

The network side device 11 provided by the embodiments of the present disclosure may be a base station. The base station may be a generally used base station, or may be an evolved node base station (eNB), or may be a network side device (for example, a next generation node base station (gNB) or a transmission and reception point (TRP)) or a cell in a 5G system, or may be a network side device in a subsequent evolved communications system.

A terminal 12 provided in this embodiment of the present disclosure may be a mobile phone, a tablet computer, a notebook computer, an Ultra-Mobile Personal Computer (UMPC), a netbook, a Personal Digital Assistant (PDA), or the like.

Figure 2:
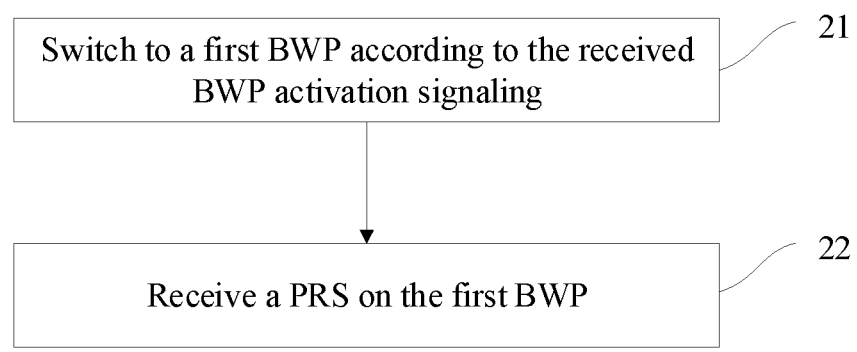
FIG. 2 is a schematic flowchart of a BWP switching method according to an embodiment of the present disclosure.

Referring to FIG. 2, FIG. 2 is a schematic flowchart of a BWP switching method according to an embodiment of the present disclosure. The BWP switching method is applied to a terminal and includes:

Step 21: switching to a first BWP according to the received BWP activation signaling; and Step 22: receiving a PRS on the first BWP,
where the first BWP meets at least one of the following:
a numerology is consistent with a numerology of the PRS; or
a bandwidth of the first BWP is not less than a bandwidth of the PRS.

The PRS may also be expressed as a PRS resource or a PRS resource set. The PRS supports beam forming, so the concept of the PRS resource is introduced. The PRS resource ID may correspond to one beam in one TRP (transmission and reception point). One or more PRS resources may form one PRS resource set, or one PRS resource set may include one or more PRS resources. One TRP may include one or more PRS resources. Meanwhile, in order to improve the audibility of the UE, PRS beam scanning and PRS beam repetition are supported. In addition, the PRS is supported to refer to a neighbor cell RS to serve as a Quasi co-position (QCL) reference signal.

In the embodiments of the present disclosure, the terminal can be switched to the first BWP conforming to the PRS measurement condition according to the received BWP activation signaling and receive the PRS on the first BWP, and the terminal does not need to measure the PRS in the measurement gap, so that it is unnecessary to interrupt data transmission, and it is suitable for Industrial Internet of Things (IIoT) and other data transmission priority scenarios.

In the embodiments of the present disclosure, the BWP activation signaling is carried through Downlink Control Information (DCI), a Medium Access Control (MAC) layer signaling or a high-layer signaling.

In the embodiments of the present disclosure, the first BWP is a BWP that is configured and pre-configured by a network side or agreed by a protocol, is (dedicatedly) used to receive a PRS, and may also be referred to as a special BWP or a positioning BWP.

In the embodiments of the present disclosure, the location of a lowest resource element (RE) of the first BWP is not higher than the lowest RE location of the PRS, and the highest RE location is not lower than the highest RE location of the PRS, that is, the bandwidth of the PRS is located in the bandwidth range of the first BWP, so that the PRS may be received on the first BWP.

In the embodiments of the present disclosure, before the switching to the first BWP according to the received BWP activation signaling, the method further includes: acquiring one or more BWP configuration information, where the BWP configuration information is configured or pre-configured on a network side or is agreed in a protocol.

Considering the latency requirement in IIoT positioning, "the first BWP" may be a BWP that is pre-configured or agreed by a protocol, for example, a pre-configured or agreed BWP with several fixed bandwidths and/or numerologies. In the IIoT scenario, in order to reduce latency, only one of PRS or positioning frequency layer may be present, and a center frequency point of the PRS or positioning frequency layer is consistent with a center frequency point of a network configured BWP (current active BWP). Then it is only necessary to perform BWP adaption in the same frequency in a case that the UE needs to measure the PRS beyond the current active BWP. Therefore, it is only necessary for the network side to pre-configure or agree a BWP with several fixed bandwidths and/or numerologies.

The BWP configuration information includes at least one of the following parameters:
a BWP identifier (ID);
a BWP subcarrier spacing (SCS);
a BWP cyclic prefix (CP) type;
a BWP usage, where the BWP usage is used to indicate whether the BWP is a BWP for receiving a PRS; or
BWP frequency domain location information.

The BWP subcarrier spacing and the BWP cyclic prefix type may also be referred to as a numerology of the BWP.

In the BWP usage, it may be an IE (cell) as follows: enum{pos}. When {pos} is configured, the BWP is a BWP dedicatedly used to receive the PRS, otherwise, the BWP is a normal BWP.

The BWP frequency domain location information may include a start frequency domain location of the BWP and BWP bandwidth information.

The BWP configuration information further includes: positioning assistance data, where the positioning assistance data at least includes PRS time-frequency domain location information.

Further, the PRS frequency domain location information is frequency domain information relative to the BWP, that is, the PRS frequency domain location information given herein is not an absolute frequency domain location, but is a location relative to the BWP frequency domain location.

The BWP configuration information further includes: configuration information associated with a downlink channel and/or a downlink signal, for example, physical downlink shared channel (PDSCH) or PDCCH configuration information. The downlink channel includes a control channel and/or a data channel.

In the embodiments of the present disclosure, before the switching to the first BWP according to the received BWP activation signaling, the method further includes: sending a first request message, where the first request message is used to indicate that the terminal needs to switch the BWP to receive the PRS, or is used to request a network side device to send the BWP activation signaling.

The first request message includes at least one of the following information:
a switching request for switching to the BWP (dedicatedly) for receiving the PRS;
a BWP switching request;
at least one parameter of the configuration information of the BWP to which the terminal expects to switch; or
BWP ID to which the terminal expects to switch;

a BWP usage to which the terminal expects to switch, where the BWP usage is used to indicate whether the BWP is a BWP for receiving a PRS;

all configuration information of the BWP to which the terminal expects to switch, where the configuration information of the BWP includes but is not limited to the frequency domain location of the BWP, the bandwidth of the BWP and the numerology of the BWP; and at least a part of positioning assistance data, where the positioning assistance data at least includes PRS time-frequency domain location information. The PRS frequency domain location information includes but is not limited to: PRS start location information, PRS bandwidth information, PRS numerology information and the like. The PRS time domain information includes but is not limited to: a PRS time domain position, a PRS period, a period offset and the like.

The BWP (dedicatedly) for receiving the PRS may also be referred to as a special BWP or a positioning BWP. The BWP has a certain period, and the period is consistent with a PRS period or is consistent with a PRS measurement time window period.

The first request message is sent in a case that at least one of the following conditions is met:

the terminal expects to measure the PRS beyond the bandwidth of the current active BWP;

the terminal expects to measure the PRS not matched with a numerology of the current active BWP;

at least a part of the bandwidth of the PRS is beyond the bandwidth of the current active BWP; or the numerology of the PRS is not matched with the numerology of the current active BWP.

In the embodiments of the present disclosure, after the switching to the first BWP according to the received BWP activation signaling, the method further includes: receiving BWP deactivation signaling, where the BWP deactivation signaling is used to indicate that the terminal is to be switched to a second BWP. The second BWP is a legacy BWP (conventional BWP) or a default BWP. The second BWP is a BWP with a small bandwidth, and the bandwidth is less than the bandwidth of the first BWP. The terminal is switched to the second BWP, so that the power consumption of the terminal may be reduced.

In the embodiments of the present disclosure, after the switching to the first BWP according to the received BWP activation signaling, the method further includes: sending a second request message, where the second request message is used to indicate that the network side device sends the BWP deactivation signaling. That is, in the embodiments of the present disclosure, the terminal actively requests the network side device to send the BWP deactivation signaling.

The second request message is sent in a case that at least one of the following conditions is met:

the terminal completes PRS measurement;

the terminal expects to interrupt PRS measurement;

the terminal expects to measure the PRS with a narrower bandwidth;

the deadline of PRS measurement arrives;

the time of a timer for PRS measurement arrives; or the time of a window time for PRS measurement arrives.

The terminal completes PRS measurement may be that PRS measurement is completed within one period, or PRS measurement is completed within a plurality or all of periods.

In the embodiments of the present disclosure, the BWP activation signaling is further used to activate a non-periodic or semi-persistent PRS. That is, the BWP activation signaling includes information for activating the non-periodic or semi-persistent PRS. The non-periodic or semi-persistent PRS is activated while the first BWP is activated, so that the reception flexibility of the PRS is improved.

In the embodiments of the present disclosure, the BWP deactivation signaling is further used to deactivate the non-periodic or semi-persistent PRS. That is, the non-periodic or semi-persistent PRS is deactivated while the first BWP is deactivated, so that the reception flexibility of the PRS is further improved.

In the embodiments of the present disclosure, after the switching to the first BWP according to the received BWP activation signaling, the method further includes: switching from the first BWP to a second BWP in a case that does not receive at least one of the following within specified time: a PRS, DCI, or a specified RS. The second BWP is a legacy BWP (conventional BWP) or a default BWP. The second BWP is a BWP with a small bandwidth, and the bandwidth is less than the bandwidth of the first BWP. The specified RS is other RS except for the PRS. The specified time may be indicated by a bandwidth part-inactivity timer (bwp-Inactivity Timer), or may be indicated by a new parameter such as a positioning bandwidth part inactivity timer (Pos-bwp-Inactivity Timer).

In the embodiments of the present disclosure, after the switching to the first BWP according to the received BWP activation signaling, the method further includes: First BWP deactivation signaling, where the BWP deactivation signaling is used to indicate that the terminal is to be switched to a second BWP. The downlink signal is a downlink signal other than the PRS. That is, the transmission of the downlink channel and/or the downlink signal is not interrupted while the PRS is received.

In the embodiments of the present disclosure, the receiving the downlink channel and/or the downlink signal on the first BWP includes: on the same OFDM symbol, the PRS and the downlink channel and/or the downlink signal are multiplexed on different resource blocks (RB) and the PRS occupies continuous RBs. That is, on the same OFDM symbol, the terminal does not expect to process the PRS and the downlink channel and/or the downlink signal on the same RB at the same time. In the embodiments of the present disclosure, by multiplexing different RBs, the transmission of the downlink channel and/or the downlink signal may not be interrupted while the PRS is received.

In the embodiments of the present disclosure, in the BWP activation or deactivation period, the terminal does not process the PRS and the downlink channel or the downlink signal. The BWP activation period refers to a period from reception of the BWP activation signal to completion of BWP switching. The BWP deactivation period refers to a period from reception of the BWP deactivation signal to completion of BWP switching.

Referring to FIG. 3, the embodiments of the present disclosure further provides a BWP switching method, applied to a first network side device and including:

Step 31: sending BWP activation signaling, where the BWP activation signaling is used to indicate that the terminal is to be switched to a first BWP to receive a PRS, where the first BWP meets at least one of the following:

a numerology is consistent with a numerology of the PRS; or a bandwidth of the first BWP is not less than a bandwidth of the PRS.

In the embodiments of the present disclosure, the network side device may send BWP activation signaling to the terminal, so that the terminal can be switched to the first BWP conforming to the PRS measurement condition and receive the PRS on the first BWP, and the terminal does not need to measure the PRS in the measurement gap, so that it is unnecessary to interrupt data transmission, and it is suitable for industrial Internet of things (IIoT) and other data transmission priority scenarios.

In the embodiments of the present disclosure, the first network side device may be one of a serving base station, a serving gNB, a serving TRP and a serving cell.

In the embodiments of the present disclosure, the BWP activation signaling is carried through downlink control information (DCI), a medium access control (MAC) layer signaling or a high-layer signaling.

In the embodiments of the present disclosure, the first BWP is a BWP that is configured and pre-configured by a network side or agreed by a protocol, is (dedicatedly) used to receive a PRS, and may also be referred to as a special BWP or a positioning BWP.

In the embodiments of the present disclosure, the location of a lowest resource element (RE) of the first BWP is not higher than the lowest RE location of the PRS, and the highest RE location is not lower than the highest RE location of the PRS, that is, the bandwidth of the PRS is located in the bandwidth range of the first BWP, so that the PRS may be received on the first BWP.

In the embodiments of the present disclosure, before the sending the BWP activation signaling, the method further includes: sending one or more BWP configuration information.

The BWP configuration information includes at least one of the following parameters:
  a BWP ID;
  a BWP subcarrier spacing;
  a BWP cyclic prefix type;
  a BWP usage, where the BWP usage is used to indicate whether the BWP is a BWP for receiving a PRS; or
  BWP frequency domain location information.

The BWP subcarrier spacing and the BWP cyclic prefix type may also be referred to as a numerology of the BWP.

The BWP configuration information further includes: configuration information of a downlink channel and/or a downlink signal.

The BWP configuration information further includes: positioning assistance data, where the positioning assistance data at least includes PRS time-frequency domain location information.

Further, the PRS frequency domain location information is frequency domain information relative to the BWP, that is, the PRS frequency domain location information given herein is not an absolute frequency domain location, but is a location relative to the BWP frequency domain location.

In the embodiments of the present disclosure, before the sending the BWP configuration information, the method further includes: receiving at least a part of positioning assistance data sent by a second network side device.

At least a part of positioning assistance data sent by the second network side device is received through an LTE Positioning Protocol Annex (LPPa) signaling.

In the embodiments of the present disclosure, the second network side device may be a positioning server.

In the embodiments of the present disclosure, the BWP activation signaling is sent in a case that at least one of the following conditions is met:
  at least a part of the bandwidth of the PRS is beyond the bandwidth of the current active BWP of the terminal; and
  the numerology of the PRS is not matched with the numerology of the current active BWP of the terminal;
  the terminal is expected to measure the PRS beyond the bandwidth of the current active BWP; or
  the terminal is expected to measure the PRS not matched with the numerology of the current active BWP.

In the embodiments of the present disclosure, after the sending the BWP activation signaling, the method further includes: sending BWP deactivation signaling, where the BWP deactivation signaling is used to indicate that the terminal is to be switched to a second BWP. The second BWP is a legacy BWP (conventional BWP) or a default BWP. The second BWP is a BWP with a small bandwidth, and the bandwidth is less than the bandwidth of the first BWP. The terminal is switched to the second BWP, so that the power consumption of the terminal may be reduced.

The BWP deactivation signaling is sent in a case that at least one of the following conditions is met:
  the terminal is expected to interrupt PRS measurement;
  the terminal completes PRS measurement;
  the deadline of PRS measurement arrives;
  the time of a timer for PRS measurement arrives; or
  the time of a window time for PRS measurement arrives.

The terminal completes PRS measurement may be that PRS measurement is completed within one period, or PRS measurement is completed within a plurality or all of periods.

In the embodiments of the present disclosure, before the sending the BWP activation signal, the method further includes: receiving a first request message, where the first request message is used to indicate that the first network side device switches the BWP of the terminal to receive the PRS, or is used to request the first network side device to send the BWP activation signaling, and the first request message is sent by the terminal or the second network side device.

In a case that the first request message is sent by the terminal, the first request message includes at least one of the following information:
  a switching request for switching to the BWP for receiving the PRS;
  a BWP switching request; BWP ID to which the terminal expects to switch;
  a BWP usage to which the terminal expects to switch, where the BWP usage is used to indicate whether the BWP is a BWP for receiving a PRS;
  configuration information of the BWP to which the terminal expects to switch, where the configuration information of the BWP includes but is not limited to the frequency domain location of the BWP, the bandwidth of the BWP and the numerology of the BWP; or
  at least a part of positioning assistance data, where the positioning assistance data at least includes PRS time-frequency domain location information.

In a case that the first request message is sent by the second network side device, the first request message includes at least one of the following information:
  a switching request for switching to the BWP for receiving the PRS;
  a BWP switching request;
  a BWP ID to which the second network side device expects to switch;
  a BWP usage to which the second network side device expects to switch, where the BWP usage is used to indicate whether the BWP is a BWP for receiving a PRS;
  configuration information of the BWP to which the second network side device expects to switch, where the configuration information of the BWP includes but is not limited to the frequency domain location of the BWP, the bandwidth of the BWP and the numerology of the BWP; or at least a part of positioning assistance data, where the positioning assistance data at least includes PRS time-frequency domain location information.

In the embodiments of the present disclosure, after the sending the BWP activation signaling, the method further includes: receiving a second request message, where the second request message is used to request the first network side device to send BWP deactivation signaling, and the BWP deactivation signaling is used to indicate that the terminal is to be switched to a second BWP. The second BWP is a legacy BWP (conventional BWP) or a default BWP. The second BWP is a BWP with a small bandwidth, and the bandwidth is less than the bandwidth of the first BWP. The terminal is switched to the second BWP, so that the power consumption of the terminal may be reduced.

In the embodiments of the present disclosure, before the sending the BWP activation signaling, the method further includes: sending one or more BWP configuration information to the second network side device. The BWP configuration information at least includes a BWP ID, a BWP frequency domain location and the like. One or more or all of the BWP configuration information sent by the second network side device is carried by an LPPa signaling.

Referring to FIG. 4, FIG. 4 is a schematic flowchart of a BWP switching method according to another embodiment of the present disclosure. The BWP switching method is applied to a second network side device and includes:

Step 41: sending a first request message, where the first request message is used to indicate that the first network side device switches the BWP of the terminal to the first BWP to receive a PRS or is used to request the first network side device to send BWP activation signaling, and the BWP activation signaling is used to indicate that the terminal is to be switched to the first BWP to receive the PRS.

The first BWP meets at least one of the following:
a numerology is consistent with a numerology of the PRS; or
a bandwidth of the first BWP is not less than a bandwidth of the PRS.

In the embodiments of the present disclosure, the second network side device may request the first network side device to switch the BWP of the terminal to receive the PRS, for example, the BWP of the terminal is switched to the first BWP. The first BWP may be a BWP with a larger bandwidth, so that the PRS with a larger bandwidth can be received. The terminal does not need to measure the PRS in the measurement gap, so that it is unnecessary to interrupt data transmission, and it is suitable for industrial Internet of things (IIoT) and other data transmission priority scenarios.

In the embodiments of the present disclosure, the second network side device may be a location server.

In the embodiments of the present disclosure, the second network side device may send a first request message to the first network side device through an LPPa signaling.

In the embodiments of the present disclosure, the first request message includes at least one of the following information:
a switching request for switching to the BWP for receiving the PRS;
a BWP switching request;
a BWP ID to which the second network side device expects to switch;
a BWP usage to which the second network side device expects to switch, where the BWP usage is used to indicate whether the BWP is a BWP for receiving a PRS;
configuration information of the BWP to which the second network side device expects to switch; or
at least a part of positioning assistance data, where the positioning assistance data at least includes PRS time-frequency domain location information.

In the embodiments of the present disclosure, before the sending the first request message, the method further includes: receiving one or more BWP configuration information sent by the first network side device. The BWP configuration information at least includes a BWP ID, a BWP frequency domain location and the like. One or more or all of the BWP configuration information received by the first network side device is carried by an LPPa signaling.

In the embodiments of the present disclosure, after the sending the first request message, the method further includes: sending a second request message, where the second request message is used to request the first network side device to send BWP deactivation signaling, and the BWP deactivation signaling is used to indicate that the terminal is to be switched to a second BWP.

In the embodiments of the present disclosure, the second request message is sent in a case that at least one of the following conditions is met:
the terminal completes PRS measurement;
the second network side device expects the terminal to interrupt PRS measurement;
the second network side device does not receive PRS measurement information within the specified time;
the deadline of PRS measurement arrives;
the time of a timer for PRS measurement arrives; or
the time of a window time for PRS measurement arrives.

In the embodiments of the present disclosure, the BWP switching method further includes: sending at least a part of positioning assistance data to the first network side device, where the positioning assistance data at least includes PRS time-frequency domain location information.

In the embodiments of the present disclosure, the second network side device sends at least a part of positioning assistance data to the first network side device through an LPPa signaling.

The BWP switching method provided by the embodiments of the present disclosure are illustrated below with reference to the specific application scenarios.

Embodiment 1 of the Present Disclosure in a case that the BWP is a BWP dedicatedly for receiving the PRS, the BWP may be indicated by the following two manners.
1) The BWP may be indicated by a BWP ID. For example, the BWP dedicatedly for receiving the PRS may be indicated through the BWP ID starting from 4 so as to be distinguished from the conventional BWP.
2) The BWP may be indicated by a BWP ID and a BWP usage. For example, the BWP dedicatedly for receiving the PRS may be indicated through the BWP ID starting from 0, but the BWP usage is indicted as positioning "pos" at the same time.

Embodiment 2 of the Present Disclosure

The network side device is pre-configured with one or more BWPs dedicatedly for receiving the PRS, and the configuration information may include positioning assistance data.

Further, a plurality of pieces of BWP frequency domain configuration information are different, where the difference of the frequency domain configuration information includes at least one of the following:
- different bandwidths;
- different center frequency points; or
- different numerologies.

Further, the positioning assistance data in any two of the plurality of BWPs at least meets one of the following:
- the same PRS time domain configuration information;
- the same PRS sequence ID information; and
- different PRS frequency domain configuration information.

The difference of the frequency domain configuration information includes at least one of the following:
- different bandwidths;
- different center frequency points;
- different numerologies; or
- different points A. The point A is a reference point for indicating a PRS frequency shift location.

The PRS frequency domain configuration information may be frequency domain information referring to a BWP frequency domain location.

The bandwidth of the PRS may be several fixed bandwidth values, such as 400 M, 200 M, 100 M, 50 M and 20 M.

Embodiment 3 of the Present Disclosure enhancement of the UE capability: because one or more BWPs (also referred to as a dedicated BWP) dedicatedly for receiving the PRS are added.

In the UE capability reporting stage, the UE reports a capability: whether to support a "dedicated BWP", and the maximum supportable bandwidth of the dedicated BWP.

Referring to FIG. 5, the embodiments of the present disclosure further provide a terminal 50, including:
- a first switching module 51, configured to switch to a first BWP according to the received BWP activation signaling; and
- a receiving module 52, configured to receive a PRS on the first BWP, where the first BWP meets at least one of the following:
a numerology is consistent with a numerology of the PRS; or
a bandwidth of the first BWP is not less than a bandwidth of the PRS.

The terminal 50 further includes:
an acquisition module, configured to acquire BWP configuration information, where the BWP configuration information is configured or pre-configured on a network side or is agreed in a protocol.

The BWP configuration information includes at least one of the following:
- a BWP ID;
- a BWP subcarrier spacing;
- a BWP cyclic prefix type;
- a BWP usage, where the BWP usage is used to indicate whether the BWP is a BWP for receiving a PRS; or
- BWP frequency domain location information.

The BWP configuration information further includes: positioning assistance data, where the positioning assistance data at least includes PRS time-frequency domain location information.

The BWP configuration information further includes: configuration information of a downlink channel and/or a downlink signal.

The terminal 50 further includes:
a first sending module, configured to send a first request message, where the first request message is used to indicate that the terminal needs to switch the BWP to receive the PRS, or is used to request a network side device to send the BWP activation signaling.

The first request message includes at least one of the following information:
- a switching request for switching to the BWP for receiving the PRS;
- a BWP switching request;
- a BWP ID to which the terminal expects to switch;
- a BWP usage to which the terminal expects to switch, where the BWP usage is used to indicate whether the BWP is a BWP for receiving a PRS;
- configuration information of the BWP to which the terminal expects to switch, where the configuration information of the BWP includes but is not limited to the frequency domain location of the BWP, the bandwidth of the BWP and the numerology of the BWP; or
- at least a part of positioning assistance data, where the positioning assistance data at least includes PRS time-frequency domain location information.

In a case that at least one of the following conditions is met, the first sending module sends a first request message:
- the terminal expects to measure the PRS beyond the bandwidth of the current active BWP;
- the terminal expects to measure the PRS not matched with a numerology of the current active BWP;
- at least a part of the bandwidth of the PRS is beyond the bandwidth of the current active BWP; or
- the numerology of the PRS is not matched with the numerology of the current active BWP.

The terminal 50 further includes:
a first receiving module, configured to receive BWP deactivation signaling, where the BWP deactivation signaling is used to indicate that the terminal is to be switched to a second BWP.

The terminal 50 further includes:
a second sending module, configured to send a second request message, where the second request message is used to indicate that the network side device sends the BWP deactivation signaling.

In a case that at least one of the following conditions is met, the second sending module sends a second request message:
- the terminal completes PRS measurement;
- the terminal expects to interrupt PRS measurement;
- the terminal expects to measure the PRS with a narrower bandwidth;
- the deadline of PRS measurement arrives;
- the time of a timer for PRS measurement arrives; or
- the time of a window time for PRS measurement arrives.

The BWP activation signaling is further used to activate a non-periodic or semi-persistent PRS.

The BWP deactivation signaling is further used to deactivate the non-periodic or semi-persistent PRS.

The terminal 50 further includes:
a second switching module, configured to: in a case that at least one of the following: a PRS, DCI and a specified RS is not received within in a specified time, switch the first BWP to a second BWP.

The terminal 50 further includes:
a second receiving module, configured to receive a downlink channel and/or a downlink signal on the first BWP, where the downlink signal is a downlink signal other than the PRS.

The second receiving module is configured to: on the same OFDM symbol, the PRS and the downlink channel and/or the downlink signal are multiplexed on different (RB) and the PRS occupies continuous RBs.

The lowest RE location of the first BWP is not higher than the lowest RE location of the PRS, and the highest RE location is not lower than the highest RE location of the PRS.

The terminal provided in this embodiment of the present disclosure can implement the processes implemented by the terminal in the method embodiment in FIG. 2. To avoid repetition, details are not described herein again.

Figure 6:
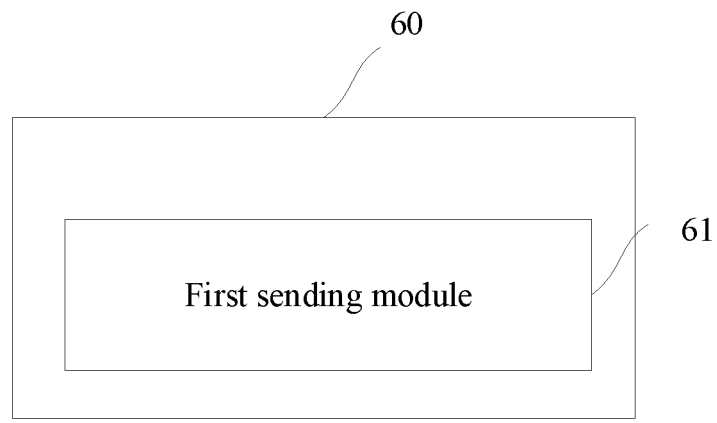
FIG. 6 is a schematic structural diagram of a first network side device according to an embodiment of the present disclosure.

Referring to FIG. 6, the embodiments of the present Disclosure further provide a first network side device 60, including.

- a first sending module 61, configured to send BWP activation signaling, where the BWP activation signaling is used to indicate that the terminal is to be switched to a first BWP to receive a PRS,
- where the first BWP meets at least one of the following:
- a numerology is consistent with a numerology of the PRS; or
- a bandwidth of the first BWP is not less than a bandwidth of the PRS.

The first network side device 60 further include: a second sending module, configured to send BWP configuration information.

The BWP configuration information includes at least one of the following:

- a BWP ID;
- a BWP subcarrier spacing;
- a BWP cyclic prefix type;
- a BWP usage, where the BWP usage is used to indicate whether the BWP is a BWP for receiving a PRS; or
- BWP frequency domain location information.

The BWP configuration information further includes: positioning assistance data, where the positioning assistance data at least includes PRS time-frequency domain location information.

The BWP configuration information further includes: configuration information of a downlink channel and/or a downlink signal.

The first network side device further includes:

- a first receiving module, configured to receive at least a part of positioning assistance data sent by a second network side device. In a case that at least one of the following conditions is met, the first sending module 61 sends BWP activation signaling:
- at least a part of the bandwidth of the PRS is beyond the bandwidth of the current active BWP of the terminal; and
- the numerology of the PRS is not matched with the numerology of the current active BWP of the terminal;
- the terminal is expected to measure the PRS beyond the bandwidth of the current active BWP; or
- the terminal is expected to measure the PRS not matched with the numerology of the current active BWP.

The first network side device further includes:

- a third sending module, configured send BWP deactivation signaling, where the BWP deactivation signaling is used to indicate that the terminal is to be switched to a second BWP.

In a case that at least one of the following conditions is met, the third sending module sends the BWP deactivation signaling:

- the terminal completes PRS measurement;
- the terminal is expected to interrupt PRS measurement;
- the deadline of PRS measurement arrives;
- the time of a timer for PRS measurement arrives; or
- the time of a window time for PRS measurement arrives.

The first network side device further includes:

- a second receiving module, configured to receive a first request message, where the first request message is used to indicate that the first network side device switches the BWP of the terminal to receive the PRS or is used to request the first network side device to send the BWP activation signaling, and the first request message is sent by the terminal or the second network side device.

The first request message includes at least one of the following information:

- a switching request for switching to the BWP for receiving the PRS;
- a BWP switching request;
- a BWP ID to which the terminal or the second network side device expects to switch;
- a BWP usage to which the terminal or the second network side device expects to switch, where the BWP usage is used to indicate whether the BWP is a BWP for receiving a PRS;
- configuration information of the BWP to which the terminal or the second network side device expects to switch; or
- at least a part of positioning assistance data, where the positioning assistance data at least includes PRS time-frequency domain location information.

The first network side device further includes:

- a third receiving module, configured to receive a second request message, where the second request message is used to request the first network side device to send BWP deactivation signaling, and the BWP deactivation signaling is used to indicate that the terminal is to be switched to a second BWP.

The terminal provided by the embodiments of the present disclosure can implement the processes implemented by the first network side device in the method embodiment in FIG. 3. To avoid repetition, details are not described herein again.

Figure 7:
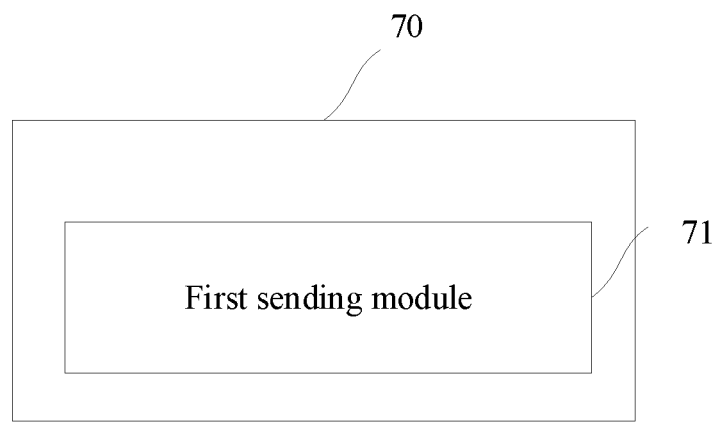
FIG. 7 is a schematic structural diagram of a second network side device according to an embodiment of the present disclosure.

Referring to FIG. 7, the embodiments of the present disclosure further provide a second network side device 70, including:

- a first sending module 71, configured to send a first request message, where the first request message is used to indicate that the first network side device switches the BWP of the terminal to a first BWP to receive a PRS or is used to request the first network side device to send BWP activation signaling, and the BWP activation signaling is used to indicate that the terminal is to be switched to the first BWP to receive the PRS.

The first BWP meets at least one of the following:

- a numerology is consistent with a numerology of the PRS; or
- a bandwidth of the first BWP is not less than a bandwidth of the PRS.

The first request message includes at least one of the following information:

- a switching request for switching to the BWP for receiving the PRS;
- a BWP switching request;
- a BWP ID to which the second network side device expects to switch;
- a BWP usage to which the second network side device expects to switch, where the BWP usage is used to indicate whether the BWP is a BWP for receiving a PRS;

configuration information of the BWP to which the second network side device expects to switch; or at least a part of positioning assistance data, where the positioning assistance data at least includes PRS time-frequency domain location information.

The second network side device further includes:

a second sending module, configured to send a second request message, where the second request message is used to request the first network side device to send BWP deactivation signaling, and the BWP deactivation signaling is used to indicate that the terminal is to be switched to a second BWP.

In a case that at least one of the following conditions is met, the second sending module sends a second request message:

the terminal completes PRS measurement;

the second network side device expects the terminal to interrupt PRS measurement;

the second network side device does not receive PRS measurement information within the specified time;

the deadline of PRS measurement arrives;

the time of a timer for PRS measurement arrives; or the time of a window time for PRS measurement arrives.

The second network side device further includes:

a third sending module, configured to send at least a part of positioning assistance data to the first network side device, where the positioning assistance data at least includes PRS time-frequency domain location information.

The terminal provided by the embodiments of the present disclosure can implement the processes implemented by the second network side device in the method embodiment in FIG. 4. To avoid repetition, details are not described herein again.

Figure 8:
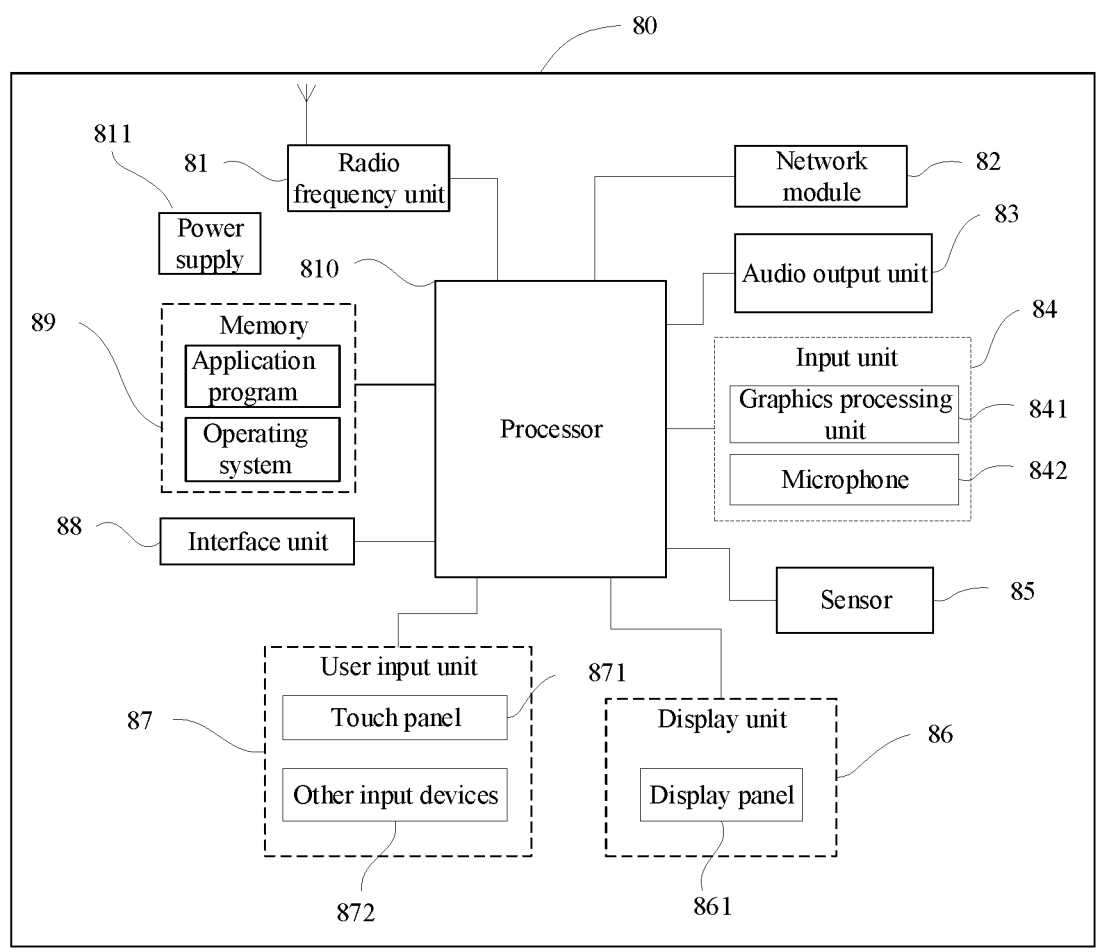
FIG. 8 is a schematic diagram of a structure of a terminal according to another embodiment of the present disclosure.

FIG. 8 is a schematic diagram of a hardware structure of a terminal for implementing the embodiments of the present disclosure. The terminal 80 includes but is not limited to components such as a radio frequency unit 81, a network module 82, an audio output unit 83, an input unit 84, a sensor 85, a display unit 86, a user input unit 87, an interface unit 88, a memory 89, a processor 810, and a power supply 811. A person skilled in the art may understand that a structure of the terminal shown in FIG. 8 does not constitute a limitation on the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, an in-vehicle terminal, a wearable device, a pedometer, and the like.

The processor 810 is configured to: switch to the first BWP according to the received bandwidth part (BWP) activation signal; and the radio frequency unit 81 is configured to receive a positioning reference signal (PRS) on the first BWP.

The first BWP meets at least one of the following:

a numerology is consistent with a numerology of the PRS; or a bandwidth of the first BWP is not less than a bandwidth of the PRS.

The terminal provided in this embodiment of the present disclosure can implement the processes implemented by the terminal in the method embodiment in FIG. 2. To avoid repetition, details are not described herein again.

In the embodiments of the present disclosure, the terminal can be switched to the first BWP according to the received BWP activation signaling and receive the PRS on the first BWP. For example, the first BWP may be a BWP with a larger bandwidth, so that the PRS with a larger bandwidth may be received. The terminal does not need to measure the PRS in the measurement gap, so that it is unnecessary to interrupt data transmission, and it is suitable for industrial Internet of things and other data transmission priority scenarios.

It should be understood that, in this embodiment of the present disclosure, the radio frequency unit 81 may be configured to receive and send information or receive and send a signal in a call process. After downlink data from a base station is received, the processor 810 processes the downlink data. In addition, uplink data is sent to the base station. Usually, the radio frequency unit 81 includes but is not limited to an antenna, at least one amplifier, a transceiver, a coupler, a low noise amplifier, a duplexer, or the like. In addition, the radio frequency unit 81 may communicate with a network and another device through a wireless communication system.

The terminal provides wireless broadband Internet access to a user through the network module 82, for example, helps the user receive and send e-mails, browse web pages, access streaming media, and the like.

The audio output unit 83 may convert audio data received by the radio frequency unit 81 or the network module 82 or stored in the memory 89 into an audio signal and output the audio signal as a sound. In addition, the audio output unit 83 may further provide an audio output (for example, a call signal received voice, or a message received voice) related to a specific function implemented by the terminal 80. The audio output unit 83 includes a speaker, a buzzer, a telephone receiver, and the like.

The input unit 84 is configured to receive an audio signal or a video signal. The input unit 84 may include a Graphics Processing Unit (GPU) 841 and a microphone 842. The graphics processing unit 841 is used to process image data of a static picture or a video obtained by an image capturing device (for example, a camera) in a video capturing mode or an image capturing mode. A processed image frame may be displayed on the display unit 86. The image frame processed by the graphics processing unit 841 may be stored in the memory 89 (or another storage medium) or sent by using the radio frequency unit 81 or the network module 82. The microphone 842 can receive sound, and can process such sound into audio frequency data. Processed audio data may be converted, in a call mode, into a format that can be sent to a mobile communication base station by using the radio frequency unit 81 for output.

The terminal 80 further includes at least one sensor 85, for example, a light sensor, a motion sensor, or another sensor. The light sensor includes an ambient light sensor and a proximity sensor. The ambient light sensor may adjust luminance of the display panel 861 based on the brightness of ambient light. The proximity sensor may turn off the display panel 861 and/or backlight when the terminal 80 is moved to an ear. As a type of the motion sensor, an accelerometer sensor may detect the magnitude of acceleration in each direction (generally, on three axes), and may detect the magnitude and a direction of gravity when being static. The accelerometer sensor may be used for recognizing a terminal gesture (for example, portrait and landscape orientation switching, a related game, or magnetometer posture calibration), a function related to vibration recognition (for example, a pedometer or a strike), or the like. The sensor 85 may further include a fingerprint sensor, a pressure sensor, an iris sensor, a molecular sensor, a gyroscope, a barometer, a hygrometer, a thermometer, an infrared sensor, and the like. Details are not described herein.

The display unit 86 is configured to display information input by a user or information provided for a user. The display unit 86 may include a display panel 861. The display panel 861 may be configured in a form of a Liquid Crystal Display (LCD), an Organic Light-Emitting Diode (OLED), or the like.

The user input unit 87 may be configured to receive input digit or character information and generate key signal input related to user setting and function control of the terminal. The user input unit 87 includes a touch panel 871 and another input device 872. The touch panel 871, also called a touch screen, may collect touch operation on or near the touch panel by users (for example, operation on the touch panel 871 or near the touch panel 871 by fingers or any suitable objects or accessories such as a touch pen by the users). The touch panel 871 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 810, and receives and executes a command sent by the processor 810. In addition, the touch panel 871 may be implemented as a resistive type, a capacitive type, an infrared type, a surface acoustic wave type, or the like. The user input unit 87 may include other input devices 872 in addition to the touch panel 871. The other input devices 872 may include but are not limited to: a physical keyboard, a function key (such as a volume control key, a switch key), a trackball, a mouse, and a joystick. Details are not described herein.

Further, the touch panel 871 may cover the display panel 861. When the touch panel 871 detects a touch operation on or near the touch panel 871, the touch operation is transmitted to the processor 810 to determine a type of a touch event, and then the processor 810 provides corresponding visual output on the display panel 861 according to the type of the touch event. In FIG. 8, the touch panel 871 and the display panel 861 are used as two independent components to implement input and output functions of the terminal. However, in some embodiments, the touch panel 871 and the display panel 861 may be integrated to implement the input and output functions of the terminal. This is not specifically limited herein.

The interface unit 88 is an interface connecting an external apparatus to the terminal 80. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 88 may be configured to receive input (for example, data information and power) from the external apparatus and transmit the received input to one or more elements in the terminal 80, or may be configured to transmit data between the terminal 80 and the external apparatus.

The memory 89 may be configured to store a software program and various data. The memory 89 may mainly include a program storage area and a data storage area. The program storage area may store an operating system, an application required by at least one function (for example, a sound play function or an image display function), or the like. The data storage area may store data (for example, audio data or an address book) or the like created based on use of the mobile phone. In addition, the memory 89 may include a high-speed random access memory, and may further include a nonvolatile memory, for example, at least one magnetic disk storage device, a flash storage device, or another volatile solid-state storage device.

The processor 810 is a control center of the terminal, and connects all parts of the entire terminal by using various interfaces and lines. By running or executing a software program and/or a module stored in the memory 89 and invoking data stored in the memory 89, the processor performs various functions of the terminal and data processing, to perform overall monitoring on the terminal. The processor 810 may include one or more processing units. The processor 810 may be integrated with an application processor and a modem processor. The application processor mainly processes an operating system, a user interface, an application program, and the like, and the modem processor mainly processes wireless communication. It can be understood that the modem processor may not be integrated into the processor 810.

The terminal 80 may further include a power supply 811 (such as a battery) that supplies power to each component. The power supply 811 may be logically connected to the processor 810 by using a power management system, to implement functions such as charging, discharging, and power consumption management by using the power management system.

In addition, the terminal 80 includes some function modules not shown, and details are not described herein.

Figure 9:
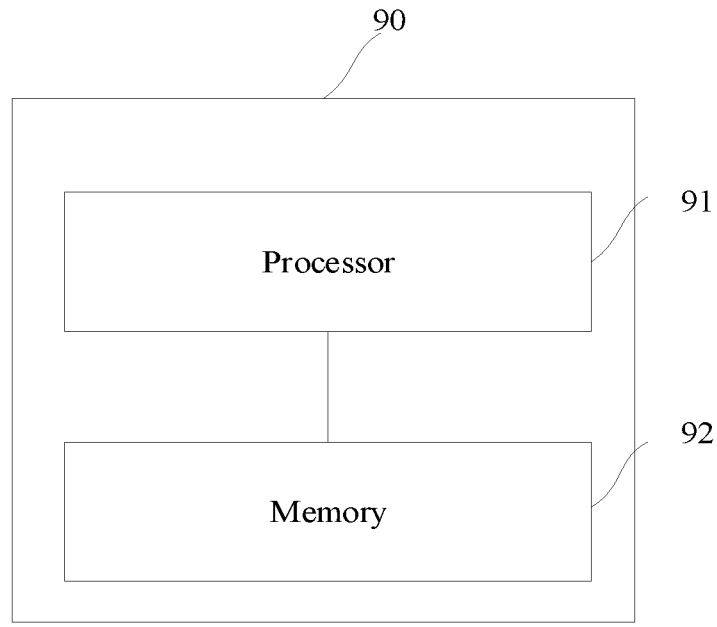
FIG. 9 is a schematic structural diagram of a terminal according to still another embodiment of the present disclosure.

Referring to FIG. 9, the embodiments of the present disclosure further provide a terminal 90, including a processor 91, a memory 92, and a computer program stored in the memory 92 and capable of running on the processor 91. When the computer program is executed by the processor 91, the processes of the BWP switching method embodiment applied to the terminal are implemented, and a same technical effect can be achieved. To avoid repetition, details are not described herein.

Figure 10:
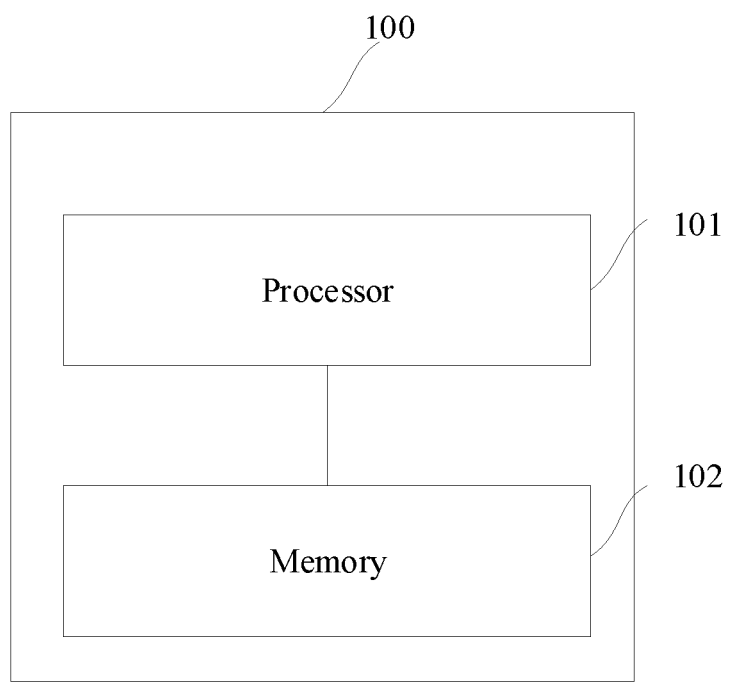
FIG. 10 is a schematic structural diagram of a first network side device according to another embodiment of the present disclosure.

Referring to FIG. 10, the embodiments of the present disclosure further provide a network side device 100, including a processor 101, a memory 102, and a computer program stored in the memory 102 and capable of running on the processor 101. When the computer program is executed by the processor 101, the processes of the BWP switching method embodiment applied to the first network side device are implemented, and a same technical effect can be achieved. To avoid repetition, details are not described herein.

Figure 11:
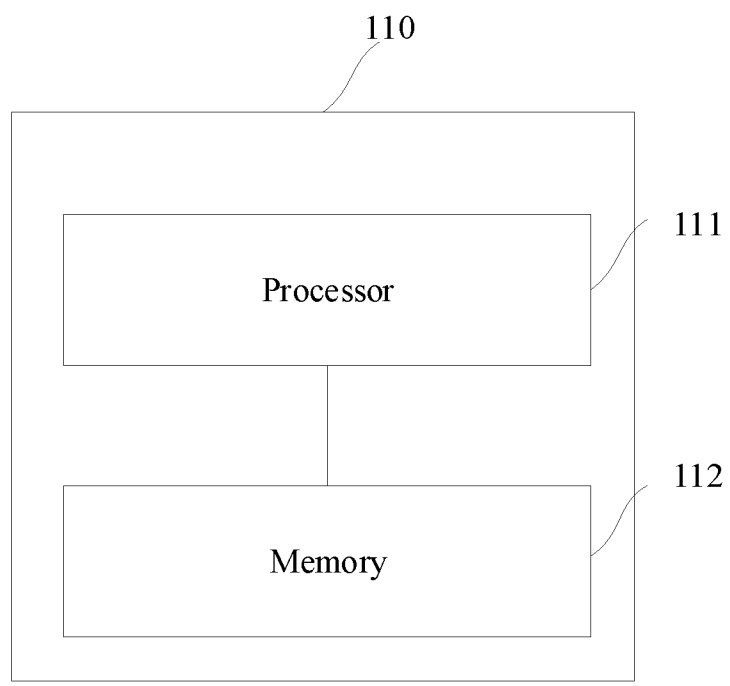
FIG. 11 is a schematic structural diagram of a second network side device according to another embodiment of the present disclosure.

Referring to FIG. 11, the embodiments of the present disclosure further provide a network side device 110, including a processor 111, a memory 112, and a computer program stored in the memory 112 and capable of miming on the processor 111. When the computer program is executed by the processor 111, the processes of the BWP switching method embodiment applied to the second network side device are implemented, and a same technical effect can be achieved. To avoid repetition, details are not described herein.

The embodiments of the present disclosure further provide a computer-readable storage medium. The computer-readable storage medium stores a computer program; when the computer program is executed by a processor, the processes of the BWP switching method embodiment applied to the first network side device are implemented; or when the computer program is executed by the processor, the processes of the BWP switching method embodiment applied to the second network side device are implemented; and a same technical effect can be achieved. To avoid repetition, details are not described herein. The computer-readable storage medium is, for example, a Read-only Memory (ROM), a Random Access Memory (RAM), a magnetic disk, or an optical disk.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not exclude another same element in a process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. Based on such understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the method described in the embodiments of the present disclosure.

The embodiments of the present disclosure are described with reference to the accompanying drawings. However, the present disclosure is not limited to the foregoing specific implementations. The foregoing implementations are merely examples, but are not limiting. A person of ordinary skill in the art may make many forms without departing from the objective and the scope of the claims of the present disclosure, and these forms all fall within the protection scope of the present disclosure.

The invention claimed is:

1. A bandwidth part (BWP) switching method, performed by a terminal, comprising:
receiving a BWP activation signaling;
switching to a first BWP according to the received BWP activation signaling; and
receiving a positioning reference signal (PRS) on the first BWP,
wherein the first BWP meets at least one of the following:
a numerology of the first BWP is consistent with a numerology of the PRS; or
a bandwidth of the first BWP is not less than a bandwidth of the PRS,
after switching to the first BWP according to the received BWP activation signaling, the method further comprises:
receiving a downlink channel or a downlink signal on the first BWP, wherein on a same orthogonal frequency division multiplexing (OFDM) symbol, the PRS and the downlink channel or the downlink signal are multiplexed on different resource blocks (RBs), the PRS occupies continuous RBs, and the downlink signal is a downlink signal other than the PRS.

2. The BWP switching method according to claim 1, wherein before the switching to the first BWP according to the received BWP activation signaling, the method further comprises:
acquiring BWP configuration information,
wherein the BWP configuration information is configured or pre-configured on a network side or is agreed in a protocol.

3. The BWP switching method according to claim 2, wherein the BWP configuration information comprises at least one of the following parameters:
a BWP identifier (ID);
a BWP subcarrier spacing;
a BWP cyclic prefix type;
a BWP usage, wherein the BWP usage is used to indicate whether the BWP is a BWP for receiving a PRS; or
BWP frequency domain location information.

4. The BWP switching method according to claim 2, wherein the BWP configuration information further comprises: positioning assistance data, and the positioning assistance data at least comprises PRS time-frequency domain location information.

5. The BWP switching method according to claim 2, wherein the BWP configuration information further comprises: configuration information of a downlink channel or a downlink signal.

6. The BWP switching method according to claim 1, wherein before the switching to the first BWP according to the received BWP activation signaling, the method further comprises:
sending a first request message, wherein the first request message is used to indicate that the terminal needs to switch the BWP to receive the PRS, or is used to request a network side device to send the BWP activation signaling.

7. The BWP switching method according to claim 6, wherein the first request message comprises at least one of the following information:
a switching request for switching to the BWP for receiving the PRS;
a BWP switching request;
at least one parameter of the configuration information of the BWP to which the terminal expects to switch; or
at least a part of positioning assistance data, wherein the positioning assistance data at least comprises PRS time-frequency domain location information.

8. The BWP switching method according to claim 6, wherein the first request message is sent when at least one of the following conditions is met:
the terminal expects to measure the PRS beyond the bandwidth of the current active BWP;
the terminal expects to measure the PRS not matched with a numerology of the current active BWP;
at least a part of the bandwidth of the PRS is beyond the bandwidth of the current active BWP; or
the numerology of the PRS is not matched with the numerology of the current active BWP.

9. A bandwidth part (BWP) switching method, performed by a first network side device, comprising:
sending a BWP activation signaling, wherein the BWP activation signaling is used to indicate that a terminal is to be switched to a first BWP to receive a positioning reference signal (PRS),
wherein the first BWP meets at least one of the following:
a numerology of the first BWP is consistent with a numerology of the PRS; or a bandwidth of the first BWP is not less than a bandwidth of the PRS, wherein the terminal receives a downlink channel or a downlink signal on the first BWP after the terminal is switched to the first BWP, wherein on a same orthogonal frequency division multiplexing (OFDM) symbol, the PRS and the downlink channel or the downlink signal are multiplexed on different resource blocks (RBs), the PRS occupies continuous RBs, and the downlink signal is a downlink signal other than the PRS.

10. The BWP switching method according to claim 9, wherein before the sending the BWP activation signaling, the method further comprises:

sending BWP configuration information, wherein the BWP configuration information further comprises at least one of:

configuration information of a downlink channel or a downlink signal; or positioning assistance data, and the positioning assistance data at least comprises PRS time-frequency domain location information.

11. The BWP switching method according to claim 10, wherein the BWP configuration information comprises at least one of the following parameters:

a BWP identifier (ID);

a BWP subcarrier spacing;

a BWP cyclic prefix type;

a BWP usage, wherein the BWP usage is used to indicate whether the BWP is a BWP for receiving a PRS; or BWP frequency domain location information.

12. The BWP switching method according to claim 9, wherein the BWP activation signaling is sent when at least one of the following conditions is met:

at least a part of the bandwidth of the PRS is beyond the bandwidth of the current active BWP of the terminal;

the numerology of the PRS is not matched with the numerology of the current active BWP of the terminal;

the terminal is expected to measure the PRS beyond the bandwidth of the current active BWP; or the terminal is expected to measure the PRS not matched with the numerology of the current active BWP.

13. The BWP switching method according to claim 9, wherein after the sending the BWP activation signaling, the method further comprises:

sending a BWP deactivation signaling, wherein the BWP deactivation signaling is used to indicate that the terminal is to be switched to a second BWP.

14. The BWP switching method according to claim 9, wherein before the sending the BWP activation signaling, the method further comprises:

receiving a first request message, wherein the first request message is used to indicate that the first network side device switches the BWP of the terminal to receive the PRS or is used to request the first network side device to send the BWP activation signaling, and the first request message is sent by the terminal or a second network side device.

15. A bandwidth part (BWP) switching method, performed by a second network side device, comprising:

sending a first request message, wherein the first request message is used to indicate that a first network side device switches the BWP of a terminal to a first BWP to receive a positioning reference signal (PRS) or is used to request the first network side device to send a BWP activation signaling, wherein the BWP activation signaling is used to indicate that the terminal is to be switched to the first BWP to receive the PRS; and the first BWP meets at least one of the following:

a numerology of the first BWP is consistent with a numerology of the PRS; and a bandwidth of the first BWP is not less than a bandwidth of the PRS, wherein the terminal receives a downlink channel or a downlink signal on the first BWP after the terminal is switched to the first BWP, wherein on a same orthogonal frequency division multiplexing (OFDM) symbol, the PRS and the downlink channel or the downlink signal are multiplexed on different resource blocks (RBs), the PRS occupies continuous RBs, and the downlink signal is a downlink signal other than the PRS.

16. The BWP switching method according to claim 15, wherein the first request message comprises at least one of the following information:

a switching request for switching to the BWP for receiving the PRS;

a BWP switching request;

at least one of configuration information of the BWP to which the second network, side device expects to switch; or at least a part of positioning assistance data, wherein the positioning assistance data at least includes PRS time-frequency domain location information.

17. The BWP switching method according to claim 16, wherein the BWP configuration information comprises at least one of the following:

a BWP identifier (ID);

a BWP subcarrier spacing;

a BWP cyclic prefix type;

a BWP usage, wherein the BWP usage is used to indicate whether the BWP is a BWP for receiving a PRS; or BWP frequency domain location information.

18. The BWP switching method according to claim 15, wherein after the sending the first request message, the method further comprises:

sending a second request message, wherein the second request message is used to request the first network side device to send a BWP deactivation signaling, and the BWP deactivation signaling is used to indicate that the terminal is to be switched to a second BWP.

19. The BWP switching method according to claim 18, wherein the second request message is sent when at least one of the following conditions is met:

the terminal completes PRS measurement;

the second network side device expects the terminal to interrupt PRS measurement;

the second network side device does not receive PRS measurement information within the specified time;

the deadline of PRS measurement arrives;

the time of a timer for PRS measurement arrives; or the time of a window time for PRS measurement arrives.

20. The BWP switching method according to claim 15, further comprising:

sending at least a part of positioning assistance data to the first network side device, wherein the positioning assistance data at least comprises PRS time-frequency domain location information.

* * * * *